(12) United States Patent
Iwakawa et al.

(10) Patent No.: US 7,965,706 B2
(45) Date of Patent: Jun. 21, 2011

(54) COMMUNICATION CONTROL APPARATUS

(75) Inventors: Akinori Iwakawa, Kawasaki (JP);
Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 890 days.

(21) Appl. No.: 11/193,426

(22) Filed: Aug. 1, 2005

(65) Prior Publication Data

US 2006/0251060 A1 Nov. 9, 2006

(30) Foreign Application Priority Data

Mar. 25, 2005 (JP) ................................. 2005-089229

(51) Int. Cl.
*H04Q 11/00* (2006.01)
(52) U.S. Cl. .......................... 370/360; 370/390; 370/432
(58) Field of Classification Search .................. 370/360, 370/394, 389, 493, 902, 912, 231, 235, 236.1
See application file for complete search history.

(56) References Cited

U.S. PATENT DOCUMENTS

| | | | | |
|---|---|---|---|---|
| 4,547,880 A * | 10/1985 | De Vita et al. | ................ | 370/362 |
| 5,659,742 A * | 8/1997 | Beattie et al. | ............... | 707/104.1 |
| 5,887,136 A | 3/1999 | Yasuda et al. | ............ | 395/200.34 |
| 6,298,240 B1 * | 10/2001 | Chavez, Jr. | .................... | 455/519 |
| 2002/0058530 A1 | 5/2002 | Akama | | |
| 2002/0078153 A1 * | 6/2002 | Chung et al. | ................ | 709/204 |
| 2003/0058844 A1 * | 3/2003 | Sojka et al. | ................... | 370/352 |
| 2004/0052350 A1 * | 3/2004 | Jaroker | .................... | 379/201.02 |
| 2004/0076157 A1 * | 4/2004 | Sojka et al. | ................... | 370/389 |
| 2004/0083282 A1 | 4/2004 | Shiga et al. | | |
| 2005/0265265 A1 | 12/2005 | Akama | | |

FOREIGN PATENT DOCUMENTS

| | | |
|---|---|---|
| JP | 9-62597 | 3/1997 |
| JP | 2001-203756 | 7/2001 |
| JP | 2002-152830 A | 5/2002 |
| JP | 2004-153352 | 5/2004 |
| WO | WO 01/35585 | 5/2001 |
| WO | WO 03/071764 | 8/2003 |

OTHER PUBLICATIONS

Office Action issued in corresponding Japanese Patent Application No. 2005-089229, mailed on Oct. 9, 2007.
European Search Report, dated Mar. 2, 2006, for related European Patent Application No. 05254785.8.
Japanese Office Action issued on Mar. 31, 2009 in corresponding Japanese Patent Application 2007-317968.

* cited by examiner

*Primary Examiner* — Man Phan
*Assistant Examiner* — Nourali Mansoury
(74) *Attorney, Agent, or Firm* — Staas & Halsey LLP

(57) ABSTRACT

A communication control apparatus that manages a media condition and a communication state of communication terminals in an integrated manner and optimizes a communication terminal environment according to events of various types is provided. A communication control module includes a terminal control portion for retaining a media information that can be handled by each of communication terminal devices belonging to a group of terminals available to one user and sending and receiving a call control information between the communication terminal devices, a virtual terminal portion that, by controlling a call with respect to the communication terminal device of another user based on the call control information, functions for the another user as a single virtual terminal, and a terminal environment optimizing portion that, at a time when an occurrence of an event is detected, refers to a media information of the event and the media information in the terminal control portion so as to determine a communication media condition corresponding to the event, and selects a communication terminal device matching this condition.

3 Claims, 11 Drawing Sheets

COMMUNICATION CONTROL APPARATUS

BACKGROUND OF THE INVENTION

1. Field of the Invention

The present invention relates to a ubiquitous computing that provides a computer environment using various instruments at hand instead of user-specific instruments. In particular, the present invention relates to a communication control apparatus for achieving a ubiquitous communication system in which terminals can be selected flexibly.

2. Description of Related Art

Accompanying a widespread use of mobile phones, facsimile machines and the like, the variety of communication instruments used by individuals has been increasing. Conventionally, these communication instruments have operated independently, so that the communication conditions therefor have not been changed in view of the communication performed by the other communication instruments. This is mainly because individual communication instruments are provided by different communication carriers using different communication technologies, making it difficult for these communication instruments to have the function of notifying each other of the communication conditions.

However, with the proliferation of VoIP (Voice over Internet Protocol) in recent years, every communication has become controllable using an IP technology. Thus, it has become relatively easy to provide the above-described function.

On the other hand, studies have been conducted on so-called ubiquitous computing, in which a computer environment utilized by an individual user and various services given thereby, for example, sending and receiving e-mails, reserving and purchasing tickets of various types, are provided by instruments at hand instead of user-specific instruments.

With these technological trends as a backdrop, when attempting to apply the concept of ubiquitous computing to a communication environment and combining various communication instruments at hand so as to provide a user's communication environment (hereinafter, this is referred to as a ubiquitous communication), it is necessary to solve such problems as at which position of an actual communication system, in which timing and on which basis the communication environment should be provided.

In order to solve such problems, as shown in FIG. 11, it has conventionally been suggested to provide a terminal media management means 91 for managing terminals and media environments of plural users in an integrated manner on a communication system (see JP 9(1997)-62597 A, for example). In the terminal media management means 91, a pair of terminals that is made to carry out communication is preset according to a communication medium. On receipt of a call setting request from a user, the terminal media management means 91 specifies a pair of terminals capable of achieving the communication medium contained in the request and gives a connection instruction specifying the medium to each terminal. Based on this connection instruction, either of the terminals makes a call origination, whereby the communication is carried out between the pair of terminals. In this manner, the communication using the terminals according to the medium is achieved between groups of terminals available to users.

SUMMARY OF THE INVENTION

However, with the conventional technology described above, the pair of terminals to be made to carry out the communication has to be predetermined, so that it has not been possible to select terminals flexibly according to communication media and events. In other words, with the above-described conventional technology, it is difficult to achieve a control of monitoring a midway event in a communication control sequence (for example, a call origination event) and preferentially using the terminal suitable for that event or that of monitoring a receiving event and preferentially using the terminal suitable for the receiving event.

Furthermore, since the above-described conventional technology does not have a function of monitoring a communication condition constantly, it is also difficult to achieve a control of adding, changing or deleting the communication terminals dynamically with respect to existing communication in the case where the terminal condition on a call origination side or a call termination side is changed.

With the above-noted problems in mind, it is an object of the present invention to provide a communication control apparatus that is interposed in a communication control channel between communication terminals, can manage a media condition and a communication state of the communication terminals in an integrated manner and optimize a communication terminal environment according to events of various types.

In order to achieve the above-mentioned object, a communication control apparatus according to the present invention is a communication control apparatus that, on a communication system in which a plurality of users carry out a communication with each other, manages a group of available terminals including a plurality of communication terminal devices available to one user in an integrated manner and that is interposed in a communication with another user by using the communication terminal device. The communication control apparatus includes a terminal control portion, provided so as to correspond to each of the communication terminal devices belonging to the group of available terminals, for retaining a media information that is handled by each of the communication terminal devices and sending and receiving a call control information between the communication terminal devices, a virtual terminal portion that, by controlling a call with respect to the communication terminal device of the another user based on the call control information, functions for the another user as a single virtual terminal combining the group of available terminals, and a terminal environment optimizing portion that, at a time when an occurrence of an event regarding a communication control sequence or an event regarding a change in a terminal environment on the communication system is detected, refers to a media information of the event contained in an event information accompanying the event and the media information in the terminal control portion so as to determine a communication media condition corresponding to the event, and selects a communication terminal device matching the determined communication media condition as a communication terminal device to be incorporated into the call from the group of available terminals.

With the above configuration, a user who carries out communication via this communication control apparatus can view the virtual terminal portion as a single virtual terminal of the communication partner user without much concern for the communication terminal devices of the partner user. Also, at the time when the occurrence of the event is detected, the terminal environment optimizing portion refers to the media information of the event and the media information in the terminal control portion so as to determine the communication media condition corresponding to the event, and selects a communication terminal device matching the determined communication media condition as the communication terminal device to be incorporated into the call from the group of available terminals, thereby making it possible to re-establish the terminal environment dynamically and flexibly according to the kinds and contents of the event.

In the communication control apparatus described above, it is preferable that the terminal control portion further retains a priority of each of the communication terminal devices, and in a case where a plurality of the communication terminal devices match the communication media condition, the terminal environment optimizing portion selects the communication terminal device to be incorporated into the call according to the priority. In this way, by setting a higher priority to a terminal to be incorporated into the call preferentially, for example, the communication terminal environment of the user can be re-established in a more preferable state.

In the communication control apparatus described above, it is preferable that, in the case where the event is a receipt of a call request from the communication terminal device of another user, the terminal environment optimizing portion compares a media information contained in the call request and the media information in the terminal control portion, sends the call request to at least a communication terminal device whose media information matches the media information contained in the call request among the group of available terminals and, on receipt of a receiving response from a communication terminal device performing a receiving operation, selects a communication terminal device capable of using a medium that is not contained in the receiving response as the communication terminal device to be incorporated into the call.

In the communication control apparatus described above, it is preferable that, in the case where the event is a receipt of a call request from the communication terminal device belonging to the group of terminals available to its own user, the terminal environment optimizing portion compares a media information contained in the call request and the media information in the terminal control portion and selects a communication terminal device corresponding to a media information that is contained in the media information in the terminal control portion but not contained in the call request as the communication terminal device to be incorporated into the call.

In the communication control apparatus described above, it is preferable that the event is a receipt of a registration request from a new communication terminal device to be added to the group of terminals available to its own user, and the terminal environment optimizing portion retains a media information of another user during a communication with the another user, compares the media information of the another user and a media information contained in the registration request in a case where the event is detected during the communication, and selects the new communication terminal device as the communication terminal device to be incorporated into the call in a case where the media information contained in the registration request matches the media information of the another user.

DETAILED DESCRIPTION OF THE INVENTION

The following is a description of embodiments of the present invention, with reference to the accompanying drawings.

Embodiment 1

Figure 2:
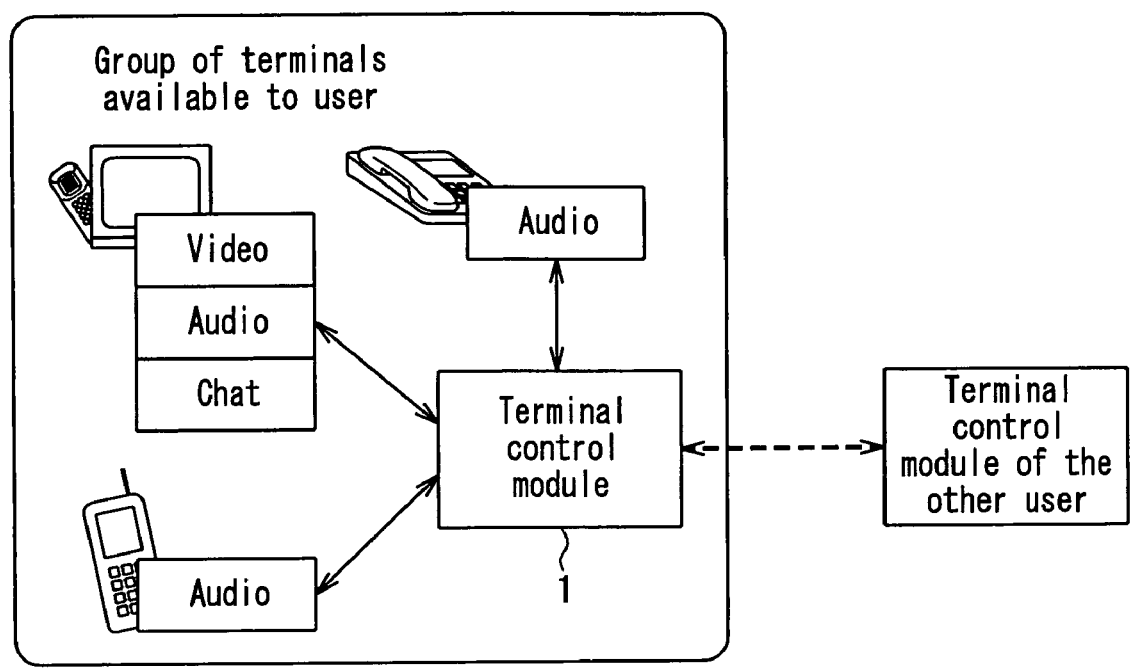
FIG. 2 is a block diagram schematically showing a basic configuration of the ubiquitous communication system according to Embodiment 1.

FIG. 2 is a block diagram schematically showing a basic configuration of a ubiquitous communication system according to an embodiment of the present invention. In the ubiquitous communication system according to the present embodiment, for each user, a group of terminals available to this user is pre-registered. Then, one terminal control module 1 is provided for a group of terminals available to one user. The terminal control module 1 has a function of managing, in an integrated manner, communication media conditions and communication states of various communication terminals included in the group of available terminals. In other words, one terminal control module 1 is present for each user, and all of the communications between the communication terminal of one user and that of the other user are executed via this terminal control module 1.

The terminal control module 1 is present in any terminals belonging to the group of terminals available to each user or in an instrument that is accessible from the group of available terminals (for example, a home server or a communication control instrument such as an exchange). In other words, the terminal or the instrument in which the terminal control module 1 is installed serves as an embodiment of the communication control apparatus of the present invention.

Figure 1:
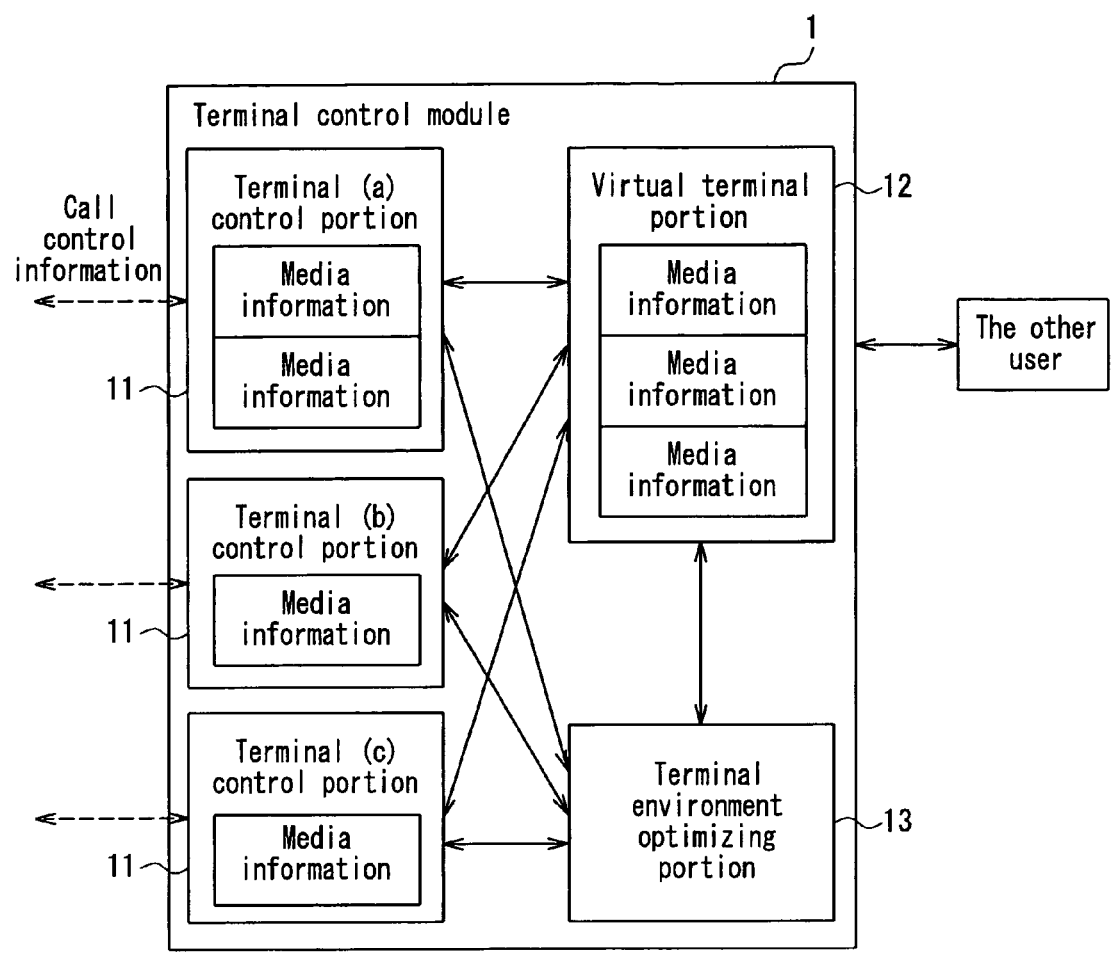
FIG. 1 is a block diagram showing a schematic configuration of a terminal control module provided in a ubiquitous communication system according to Embodiment 1 of the present invention.

FIG. 1 is a block diagram showing an internal configuration of the terminal control module 1 according to the present embodiment. As shown in FIG. 1, the terminal control module 1 has a terminal control portion 11, a virtual terminal portion 12 and a terminal environment optimizing portion 13.

The terminal control portion 11 is present in each communication terminal included in a group of terminals available to the user. In the example illustrated in FIG. 1, there are three terminal control portions 11 corresponding to three communication terminals (a to c), which are not shown in the figure. In other words, a terminal whose information is registered in the terminal control portion 11 serves as the "available terminal." The terminal control portion 11 retains not only information specifying each terminal such as a terminal ID (not shown) but also a name and an attribute of media that can be handled by each terminal as "media information."

Every time an event such as turning on/off a power or change in terminal setting occurs in each communication terminal, the name and attribute of the media that can be handled by each communication terminal are notified from the communication terminal to the terminal control portion 11. In this manner, the media information of the terminal control portion 11 is constantly updated according to the current state of the communication terminal.

The terminal environment optimizing portion 13 monitors communication control events and determines a terminal and a medium to be used for communication with the other user according to a pre-registered optimization logic at each event occurred. The terminal environment optimizing portion 13 also has a function of sending out call control information such as a call request, a change request or a disconnection request to the group of available terminals via the terminal control portion 11 as necessary.

The virtual terminal portion 12 has a function of sending and receiving messages with respect to the terminal of the other user (the terminal control module of the other user) and synthesizes the media information of terminals selected from the group of available terminals as the terminals to be used for the communication (to be incorporated into the call) into a single message and send it to the other user. Also, the virtual terminal portion 12 performs a call control such as a call establishing, a call clearing and a media change with respect to the virtual terminal portion 12 of the other user. In this manner, a user of the ubiquitous communication system of the present embodiment can view the virtual terminal portion 12 as a single virtual terminal of the other user without much concern for the terminals of the communication partner.

Figure 3:
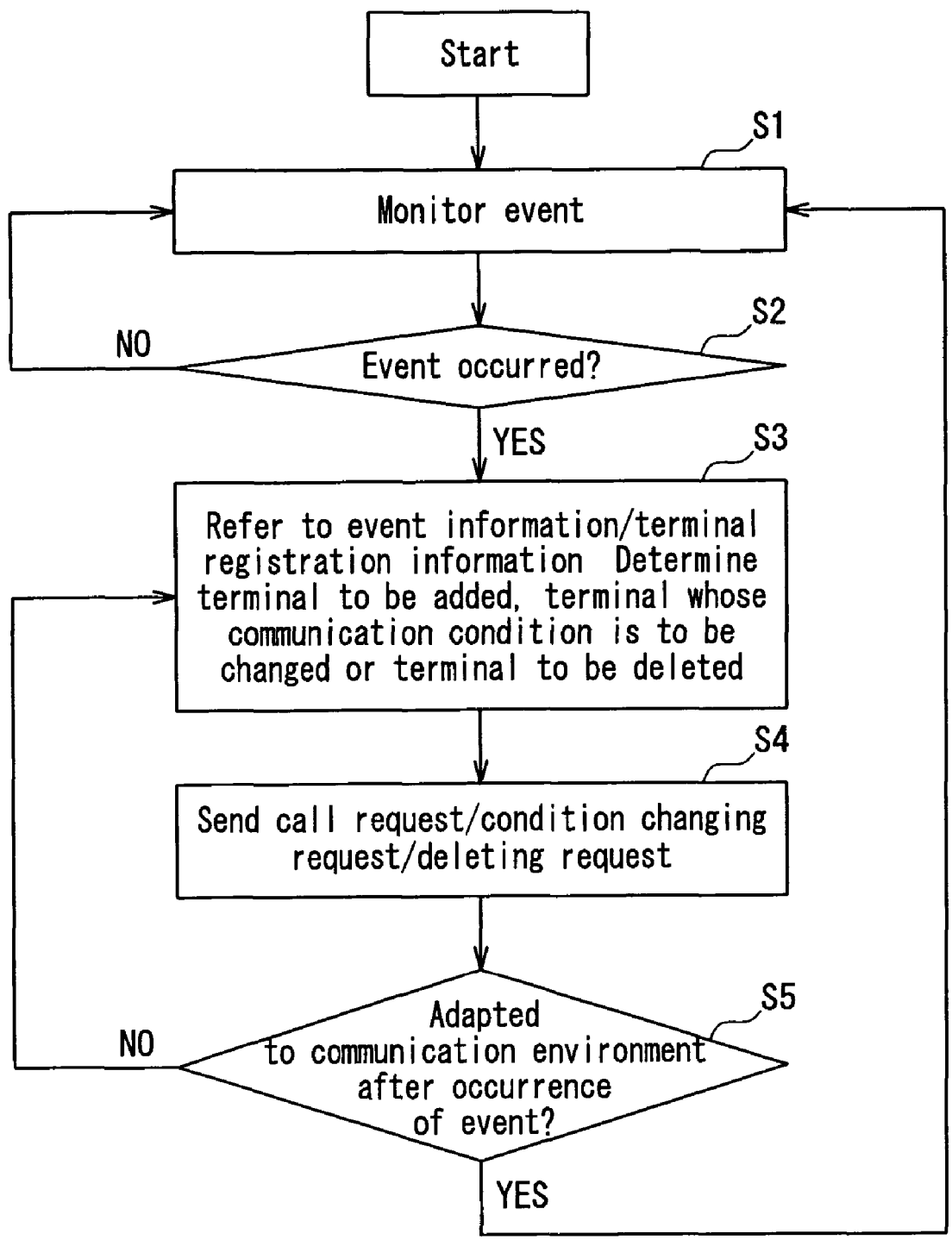
FIG. 3 is a flowchart showing an example of an operation of a terminal environment optimizing portion according to Embodiment 1.

FIG. 3 is a flowchart showing a basic operation of the terminal environment optimizing portion 13 according to the present embodiment. As shown in FIG. 3, the terminal environment optimizing portion 13 constantly monitors a communication control event (S1, S2). The communication control event includes an event regarding a communication control sequence and an event regarding a change in a terminal environment on a communication system. The event regarding the communication control sequence is, for example, a call request. It is noted that there are two kinds of the call request: one is a call request received through the virtual terminal portion 12 (in the case of a call origination from the other user) and the other is a call request received through the terminal control portion 11 (in the case of a call origination from any of the user's own group of available terminals). Also, the event regarding the change in the terminal environment on the communication system is, for example, a "registration request" issued from a new terminal when the new terminal is added to the group of terminals available to a user or a "communication condition changing request" sent out from the other user during communication.

When the communication control event is detected (YES in S2), the terminal environment optimizing portion 13 refers to event information contained in the event and media information retained in each of the terminal control portions 11 and, according to a pre-registered event processing logic, (1) determines a terminal to be added to a call, (2) determines a terminal whose communication condition has to be changed from among the terminals that have already been added to the call or (3) determines a terminal to be deleted from the call (S3). Then, according to the processing result of S3, the terminal environment optimizing portion 13 (1) sends a call request, (2) sends a communication condition changing request or (3) sends a call deleting request (S4). In the case where the above-noted event is the event regarding the communication control sequence, it contains information about media constituting a call as the event information. Also, in the case where the above-noted event is the event regarding the change in the terminal environment on the communication system, it contains information about media available to a terminal as the event information. The media information contains not only information indicating kinds of media such as video and audio but also codec information of the media, for example, MPEG4 or G.711, a use band and information such as an IP address and a port number in which a media stream is sent and received.

The operations of S3 and S4 described above are repeated until it is judged that a communication environment adapted to a state after the occurrence of the communication control event is established (YES in S5). If the result of S5 is YES, the operation returns to the event monitoring state of S1.

Figure 11:
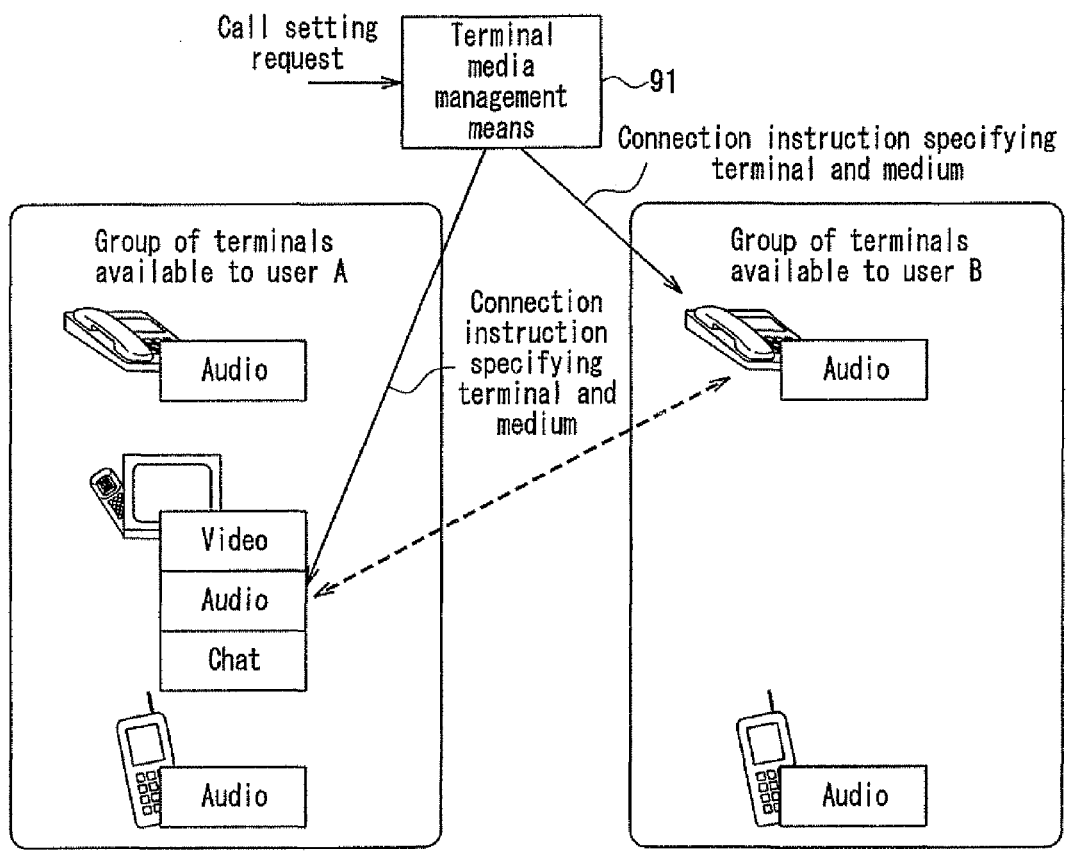
FIG. 11 is a block diagram schematically showing a basic configuration of a conventional ubiquitous communication system.

As described above, in accordance with the present embodiment, at the time of the occurrence of an event, the terminal environment optimizing portion 13 selects a terminal to be added to a call from among the group of terminals available to the user, selects a terminal whose connection condition should be changed from among the terminals that have already been added to the call or selects a terminal to be deleted from the call based on the event information and the media information. In other words, in the ubiquitous communication system according to the present embodiment, the terminal environment optimizing portion 13 is provided for each user, whereby the communication terminal according to the event occurred is selected automatically. Consequently, compared with a conventional ubiquitous communication system in which a pair of terminals to be used for communication with the other user has to be predetermined (see FIG. 11), a ubiquitous communication system allowing a more flexible terminal selection can be achieved.

Figure 4:
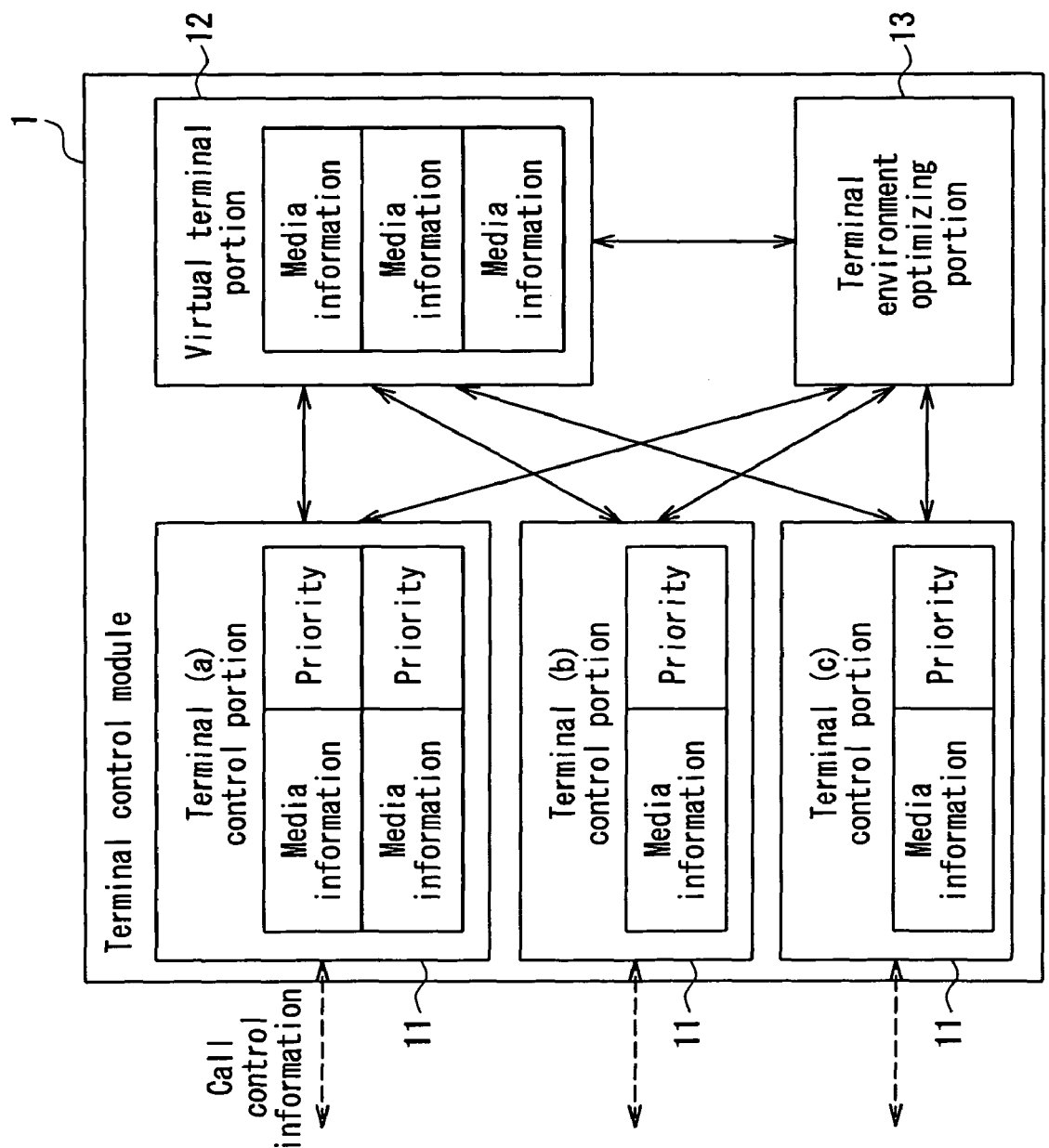
FIG. 4 is a block diagram showing a schematic configuration of another example of the terminal control module according to Embodiment 1.

Incidentally, in S3 described above, as an example of the logic when the terminal environment optimizing portion 13 determines a terminal to be added, changed or deleted, such a determination may be made based on a preset priority. In this case, as shown in FIG. 4, it is appropriate that the terminal control portion 11 retains not only the media information of each terminal but also the priority of each terminal. Then, it is appropriate that, when executing S3 described above, the terminal environment optimizing portion 13 takes the priority into consideration in addition to the above-mentioned event information and media information. In other words, in the case where a plurality of terminals can handle the same medium, the terminals are selected in descending order of priority.

As described above, if the terminal environment optimizing portion 13 takes the preset priority into consideration in addition to the event information and media information when determining a terminal to be added, changed or deleted, it is possible to achieve a more preferable state of the user's communication terminal environment by giving a high priority to the terminal to be incorporated preferentially into the call, for example.

Here, the operation of the terminal environment optimizing portion 13 in the case where the event detected in S1 and S2 in FIG. 3 is a receiving event from the other user will be described with reference to FIG. 5.

Figure 5:
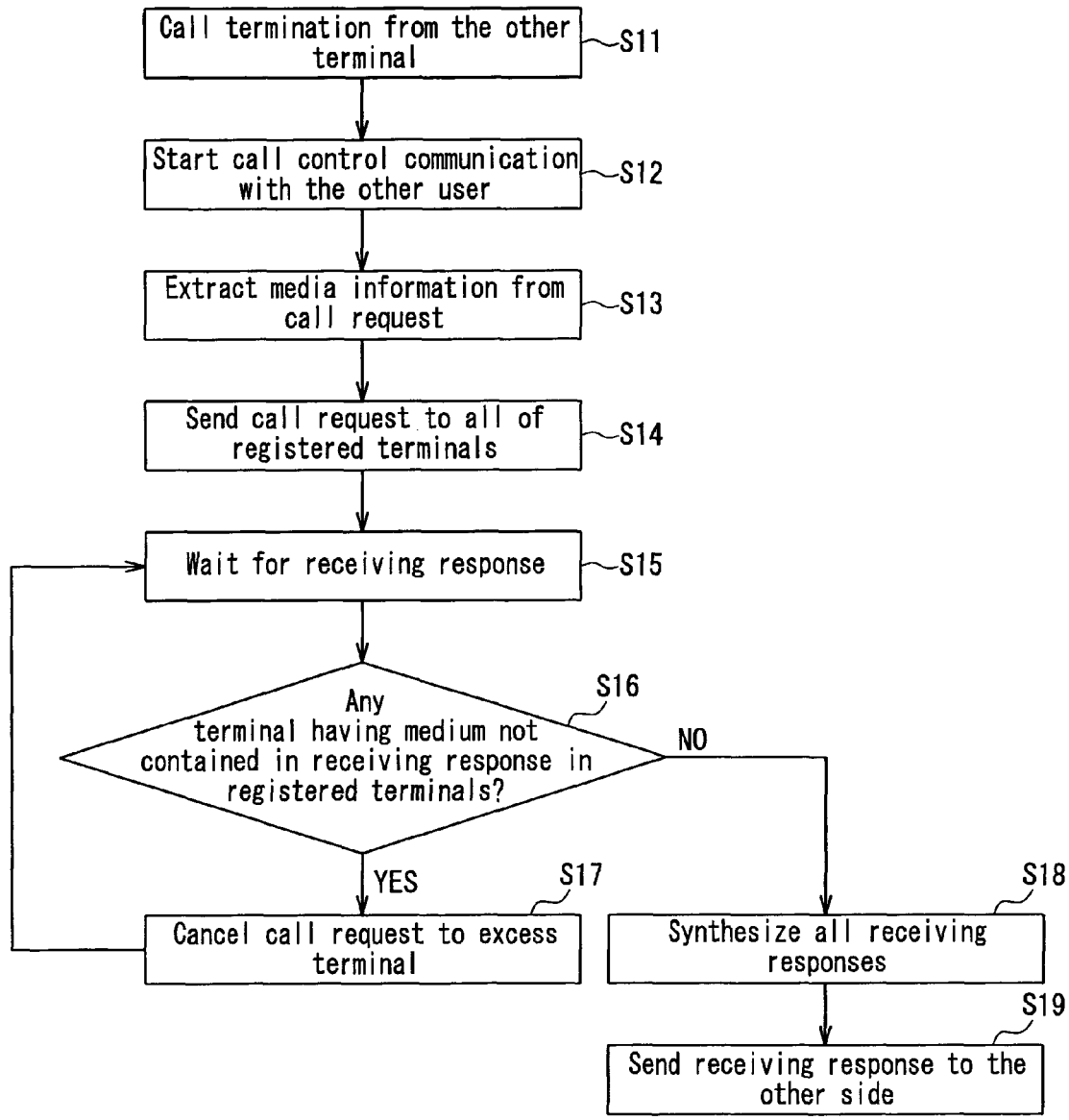
FIG. 5 is a flowchart showing the operation of the terminal environment optimizing portion in the case where a detected event is a receiving event from the other user.

In this case, as shown in FIG. 5, when detecting a call termination from the terminal of the other user (S11), the terminal environment optimizing portion 13 starts a call control communication with the other user (S12).

Next, the terminal environment optimizing portion 13 extracts media information from a call request from the other user (S13). Then, the terminal environment optimizing portion 13 sends the call request via the terminal control portion 11 to all of the available terminals registered in the terminal control module 1 (S14). In this case, a ringing tone or the like for notifying the call termination is heard in all of the available terminals. After sending the call request in S14 described above, the terminal environment optimizing portion 13 turns into a state of waiting for a receiving response (S15).

When a user performs a call termination operation in any of the terminals, the receiving response is returned from this terminal to the terminal control portion 11 corresponding to this terminal in the terminal control module 1. The terminal environment optimizing portion 13 receives this receiving response from the terminal control portion 11. The receiving response describes a medium that the terminal issuing the receiving response has consented to use for communication and a condition therefor. Thus, the terminal environment optimizing portion 13 compares the media information extracted from the call request in S13 and the media information contained in the receiving response. In this way, it is judged whether there is any terminal capable of handling a medium that is contained in the call request but not contained in the received receiving response (in the following, referred to as a deficient medium) in the available terminals (S16).

If the result of S16 is YES, a call request regarding the deficient medium is resent (S17), then returning to the state of waiting for the receiving response in S15. In S17, if there is any call request that has already been made with respect to the terminal incapable of handling the deficient medium, this call request preferably is canceled.

Thereafter, the operations of S15 to S17 are repeated until the result of S16 becomes NO. When the result of S16 becomes NO, then all the receiving responses are synthesized to generate a single receiving response to the other user (S18), and it is sent to the other user (S19).

By following the above-described procedure, triggered by receiving the receiving event from the other user, it is possible to select the terminal adapted to the medium contained in the call request from the other user and establish a call between the selected terminal and the terminal of the other user. In this way, when receiving the receiving event from the other user, it is possible to establish a communication terminal environment adapted to that medium dynamically and flexibly.

Although the call request is sent to all of the available terminals registered in the terminal control module 1 in S14, this is merely an example. In other words, it is appropriate to send the call request to at least communication terminal devices whose media information matches the media information contained in the call request among the group of available terminals.

Now, the operation of the terminal environment optimizing portion 13 in the case where the event detected in S1 and S2 in FIG. 3 is an originating event from any of the terminals available to the terminal environment optimizing portion 13 itself will be described with reference to FIG. 6.

Figure 6:
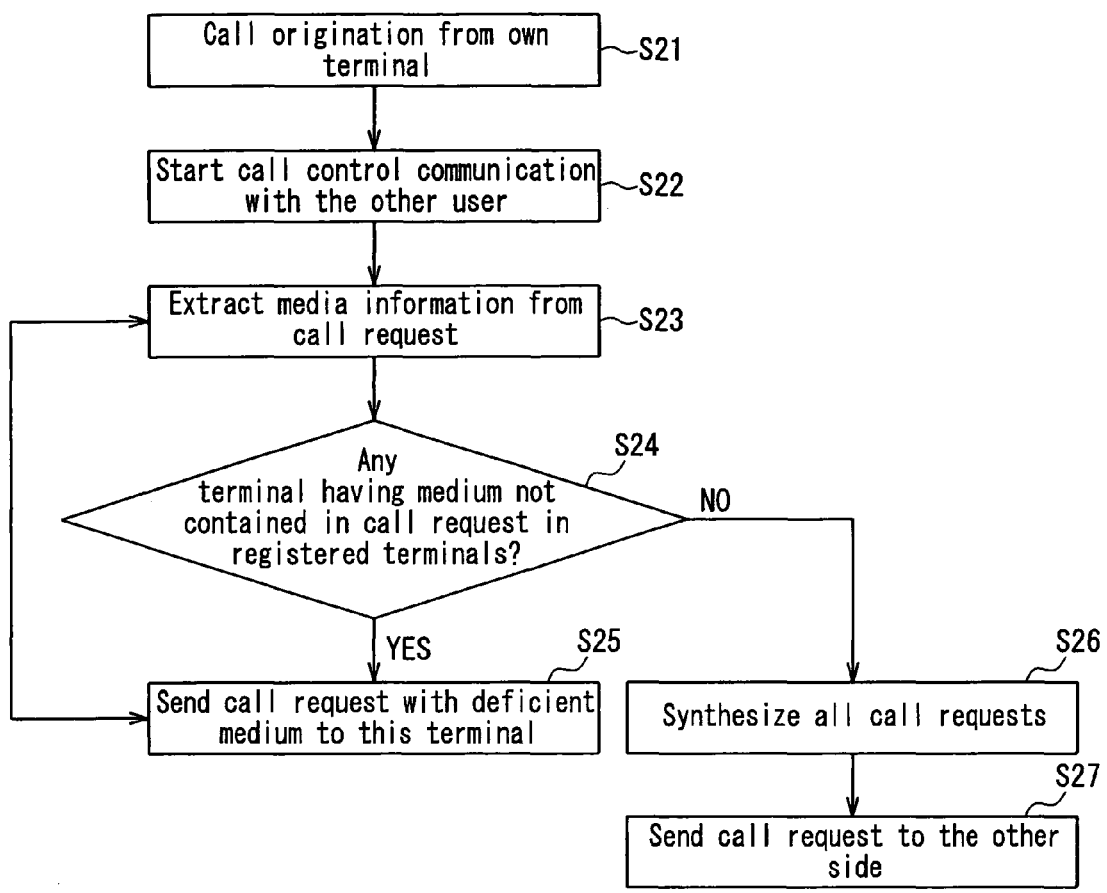
FIG. 6 is a flowchart showing the operation of the terminal environment optimizing portion in the case where the detected event is an originating event from itself.

In this case, as shown in FIG. 6, when detecting a call origination from any of its own available terminals (S21), the terminal environment optimizing portion 13 starts a call control communication with the other user (S22).

Next, the terminal environment optimizing portion 13 extracts media information from a call request (S23). Then, the terminal environment optimizing portion 13 compares the media information extracted from the call request in S23 and the media information in the terminal control portion 11, thereby judging whether there is any terminal capable of handling a medium other than that contained in the call request (in the following, referred to as a yet-to-be added medium) in the available terminals (S24).

If the result of S24 is YES, a call request regarding the yet-to-be added medium is sent to this terminal (S25), then returning to S23.

Thereafter, the operations of S23 to S25 are repeated until the result of S24 becomes NO. When the result of S24 becomes NO, then all the call requests are synthesized (S26), and sent to the other user (S27).

By following the above-described procedure, triggered by receiving the originating event from the terminal available to the terminal control module 1, the terminal control module 1 can select the medium that can be handled by the group of terminals available to the terminal control module 1 itself, generate and send a call request containing its media information. In this way, in the case where the original call request contains media information of "audio" alone and a terminal capable of handling "video" is present in the group of available terminals, for example, the call request that is to be sent finally to the other user contains the media information of both "audio" and "video." As described above, the terminal control module 1 can establish the communication environment with the other user dynamically and flexibly according to the status of the terminal available to the terminal control module 1 itself.

Figure 7A:
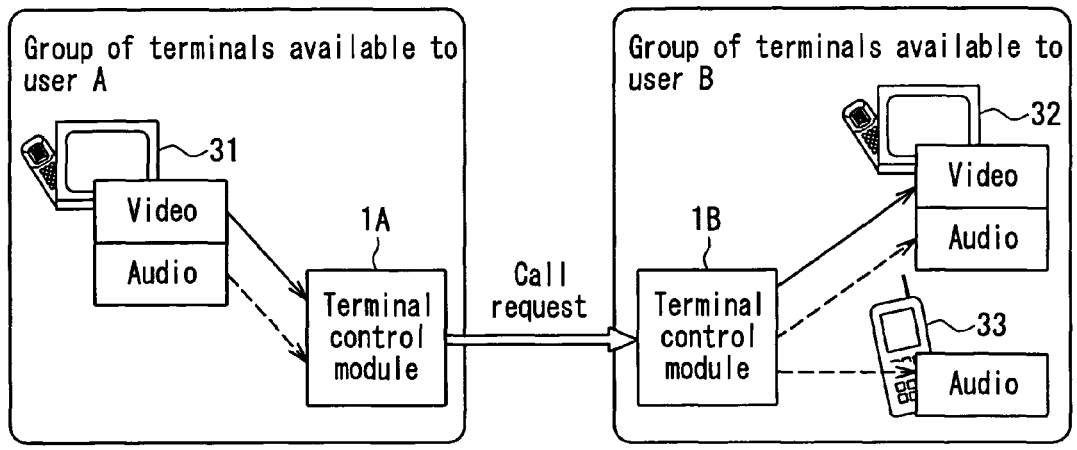
FIGS. 7A to 7C are drawings for describing more specifically the operation of the ubiquitous communication system according to Embodiment 1.
Figure 7B:
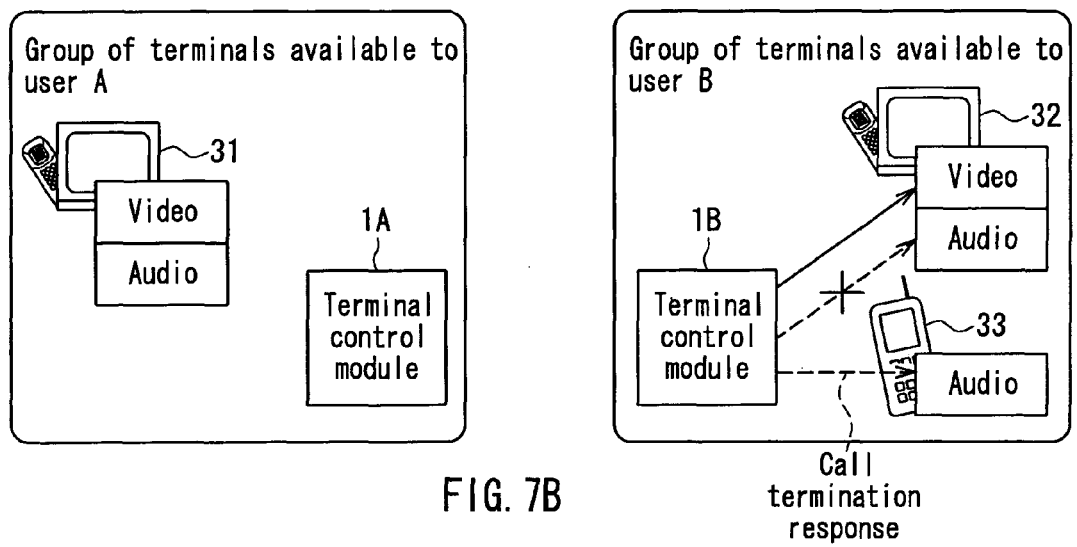
Figure 7C:
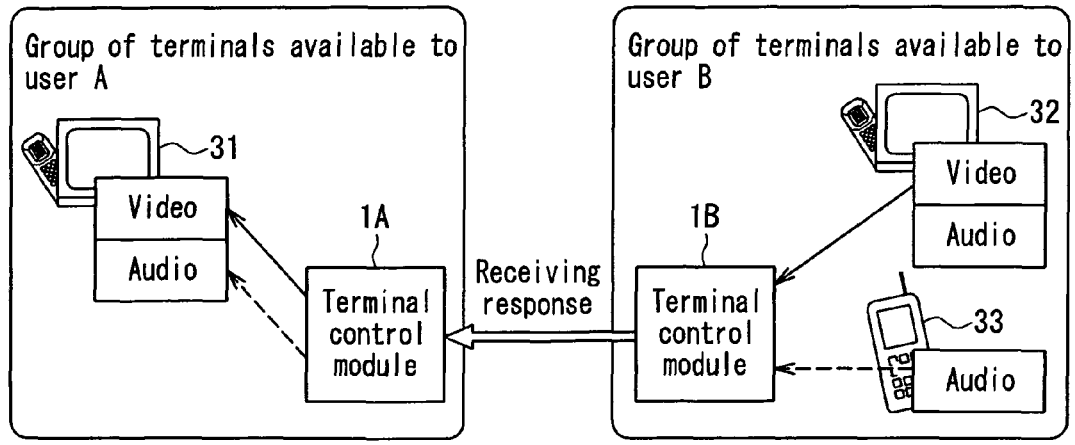

Hereinafter, referring to FIGS. 7A to 7C, the operation of a ubiquitous communication system according to the present embodiment will be described by way of more specific examples. FIGS. 7A to 7C illustrate an example in which communications are carried out between a user A and a user B, with numeral 1A indicating a terminal control module of the user A and numeral 1B indicating a terminal control module of the user B. Similarly, the reference numerals of the constituent members in the terminal control module of each user are also followed by A or B for differentiating the users.

Here, as shown in FIG. 7A, a videophone 31 is present as the user A's terminal, and a videophone 32 and a mobile phone 33 that is capable of only audio conversation are present as the user B's terminals. When the user A performs a call origination operation to the user B, the call request from the videophone 31 of the user A once goes through the virtual terminal portion 12A of the terminal control module 1A of the user A and is sent to the virtual terminal portion 12B of the terminal control module 1B of the user B. Here, the call request from the videophone 31 contains two kinds of media, namely, "video" and "audio." The virtual terminal portion 12B stores the media (audio and video) contained in the call request.

When the call request is received at the virtual terminal portion 12B of the terminal control module 1B of the user B, the terminal environment optimizing portion 13B distributes the received call request to all of the terminals registered in the terminal control portion 11B as described above. In this case, a ringing tone is heard in both of the videophone 32 and the mobile phone 33 that serve as the terminals available to the user B. At this time, based on the media information pre-registered in the terminal control module 1B, the medium that cannot be handled by the terminals available to the user B may be deleted from the call request.

Now, as shown in FIG. 7B, it is assumed that the user B performs a call termination operation by pressing a "Call/Answer" button of the mobile phone 33 at hand. A call termination response as a notification of this is provided to the virtual terminal portion 12B of the terminal control module 1B. A response usually describes a medium that the terminal has consented to use for communication and a condition therefor. In this case, the response from the mobile phone 33 describes the "audio" medium. Since the virtual terminal portion 12B stores the media (audio and video) contained in the call request as described above, the terminal environment optimizing portion 13B compares this with the media information described in the response and still recognizes the deficiency in the "video" medium.

As described in FIG. 7A, the call request containing the media information of both audio and video has been sent to the videophone 32, but the response for the "audio" medium is obtained from the mobile phone 33. Thus, as shown in FIG. 7B, the original call request is changed so that the call request for the "video" alone is sent to the videophone 32. In the case where SIP (Session Initiation Protocol) is used for the call control protocol, by canceling the preceding request and sending a new call request containing "video" alone as the medium, it is possible to change the request. At this time, a special flag may be inserted into the request so as to start communication unconditionally in the terminal receiving this request.

As a result, as shown in FIG. 7C, since the receiving response from the videophone 32 contains "video" alone, the terminal control module 1B can confirm the call reception for all of the media (audio and video) contained in the call request. Subsequently, the virtual terminal portion 12B in the terminal control module 1B synthesizes the respective pieces of media information contained in the received receiving responses into one piece of media information and send it to the calling subscriber user as a single receiving response.

Embodiment 2

Figure 8:
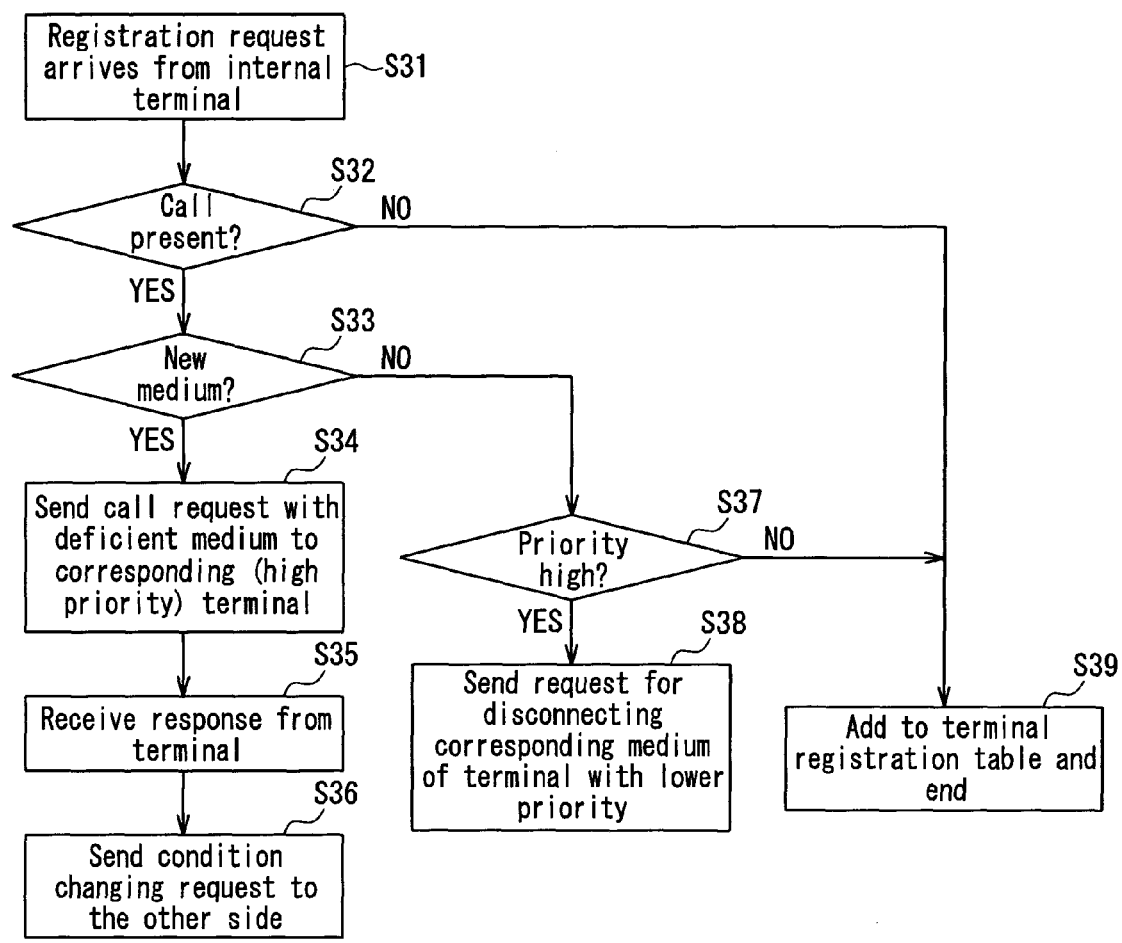
FIG. 8 is a flowchart showing an operation of a terminal environment optimizing portion on the side of a terminal control module whose group of available terminals has been changed in Embodiment 2 of the present invention.
Figure 9:
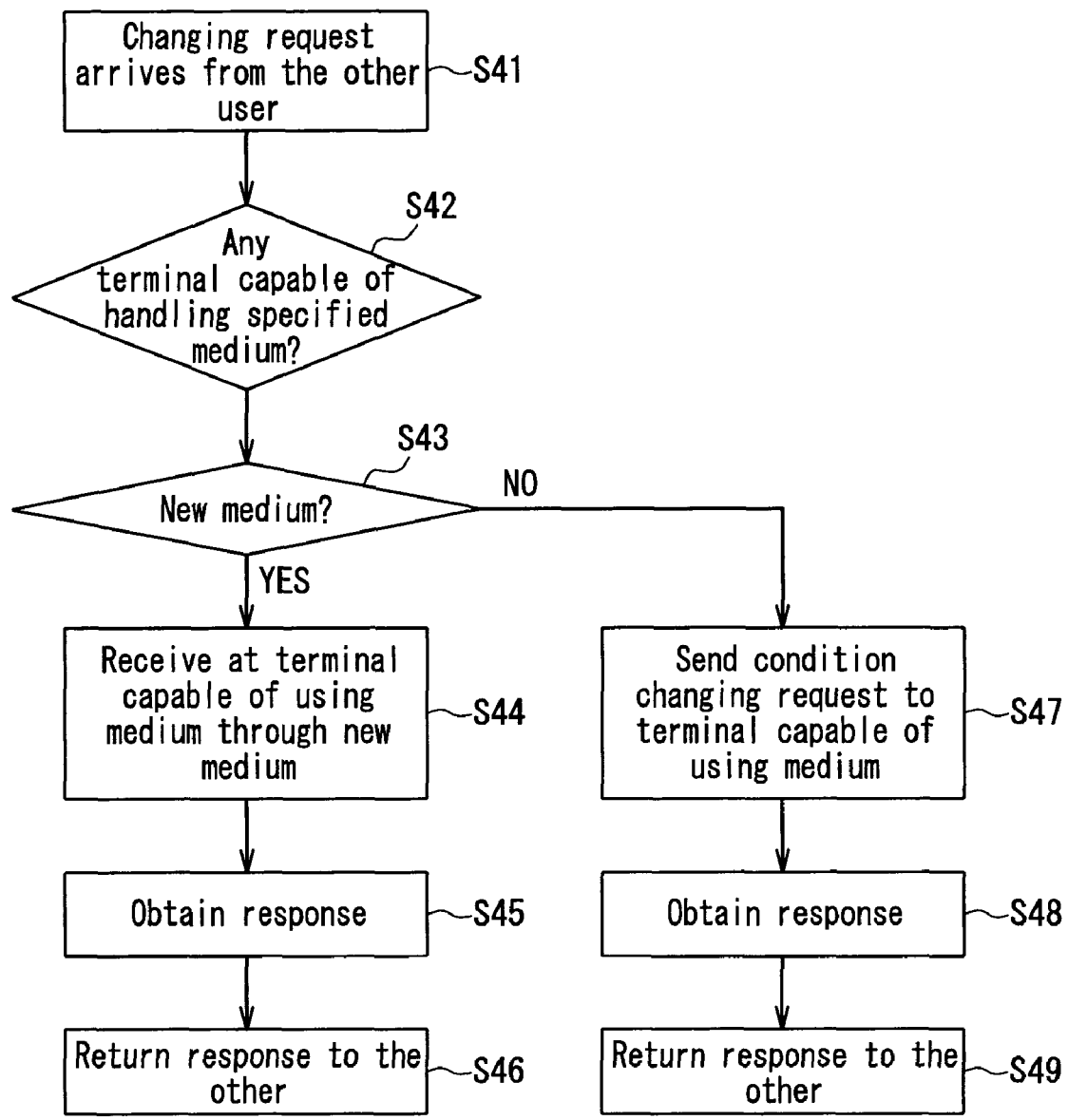
FIG. 9 is a flowchart showing an operation of a terminal environment optimizing portion of a terminal control module, with a call present between this terminal control module and the terminal control module shown in FIG. 8, in Embodiment 2 of the present invention.

The following is a description of another embodiment of the ubiquitous communication system according to the present invention, with reference to FIGS. 8 and 9. The configuration of the terminal control module of the ubiquitous communication system according to the present embodiment is the same as that illustrated in FIG. 4 in Embodiment 1. In other words, for each terminal in the group of available terminals, the media information and the priority are stored in the terminal control portion 11.

The ubiquitous communication system according to the present embodiment has a function of, when there is a change in a terminal environment of a user and if a call is present with respect to another user at this time, resetting a call dynamically according to the environment after the change. It is noted that the change in the terminal environment of a user means not only an addition, a change or a deletion of a terminal with respect to the group of terminals available to the user but also an addition or a deletion of the kinds of media in each terminal or a change in a parameter regarding the kind of each medium such as codec, a use band and an IP address and a port number in which a media stream is sent and received.

FIGS. 8 and 9 are flowcharts showing operations of the terminal environment optimizing portion 13 in the terminal control module 1 according to the present embodiment. FIG. 8 shows the operation on the side of the terminal control module 1 whose group of available terminals has been changed, and FIG. 9 shows the operation on the side of a terminal control module, with a call present between this terminal control module and the terminal control module 1 shown in FIG. 8.

When there is a change in the terminal environment, a registration request is sent from the terminal control portion 11 corresponding to the terminal subjected to this change to the terminal environment optimizing portion 13. Incidentally, the registration request describes an addition or a deletion of the kinds of media accompanying the addition, change or deletion of the terminal, or a change in a parameter regarding the kind of each medium such as codec, a use band and an IP address and a port number in which a media stream is sent and received. As shown in FIG. 8, on receipt of this registration request (S31), the terminal environment optimizing portion 13 judges whether any call is present with respect to another user's terminal (S32).

If the result of S32 is NO, the terminal environment optimizing portion 13 registers a terminal control portion corresponding to that terminal in the terminal control module 1 and ends the operation (S39). On the other hand, if the result of S32 is YES, the terminal environment optimizing portion 13 judges whether a new medium has been added (S33). If the result of S33 is YES, the terminal environment optimizing portion 13 sends a call request regarding a deficient medium at the current moment to a terminal corresponding to the new medium via the terminal control portion 11 corresponding to this terminal (S34). Then, on receipt of a response from that terminal (S35), the terminal environment optimizing portion 13 sends a communication condition changing request to the other user (S36). This changing request describes information about the media that has been changed.

On the other hand, if the result of S33 is NO, the terminal environment optimizing portion 13 compares the priority of the changed terminal and the priority of the terminal with which the call is established (S37) and, if the former has higher priority (YES in S37), sends a request for disconnecting the corresponding medium of the terminal with which the call is established and sets a call using the terminal with higher priority (the above-noted changed terminal) for that medium (S38).

The above description has been directed to the operation of the terminal environment optimizing portion 13 in the terminal control module 1 of the user whose group of available terminals has been changed. Now, the following is the operation of the terminal environment optimizing portion 13 in the terminal control module 1 of the user who has been in communication with the user whose group of available terminals has been changed.

As shown in FIG. 9, on receipt of a communication condition changing request from the other user (the user whose group of available terminals has been changed) (S41), the terminal environment optimizing portion 13 refers to the information of the medium specified in the request and judges whether there is any terminal capable of handling that medium in the group of terminals available to the terminal environment optimizing portion 13 itself (S42). If the result of S42 is YES, the terminal environment optimizing portion 13 judges whether this medium is a new medium (S43). If the result of S43 is YES, the terminal environment optimizing portion 13 allows the terminal judged to be capable of handling the above-noted medium in S42 to execute a reception through the new medium (S44). Then, the terminal environment optimizing portion 13 obtains a response from this terminal (S45) and returns the obtained response to the other user (S46).

On the other hand, if the result of S43 is NO, the terminal environment optimizing portion 13 sends a communication condition changing request to a terminal capable of using that medium via the terminal control portion 11 (S47). Then, the terminal environment optimizing portion 13 obtains a response from this terminal (S48) and returns the obtained response to the other user (S49).

As described above, in the ubiquitous communication system according to the present embodiment, when there is a change in the group of available terminals, it triggers the optimization of the terminal environment for both of the user whose group of available terminals has been changed and the user who has been in communication with that user. In other words, even when there is a change in the terminal environment of either of the users in the state where a call is established, the call is reset automatically in such a manner as to be adapted to the terminal environment after the change. This makes it possible to select terminals dynamically and flexibly according to the change in the terminal environment.

Figure 10A:
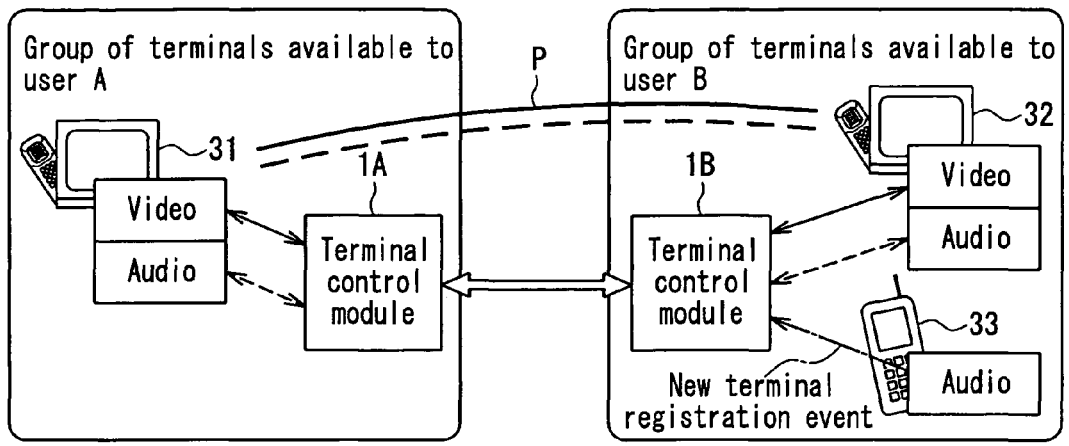
FIGS. 10A to 10C are drawings for describing more specifically the operation of the ubiquitous communication system according to Embodiment 2.
Figure 10B:
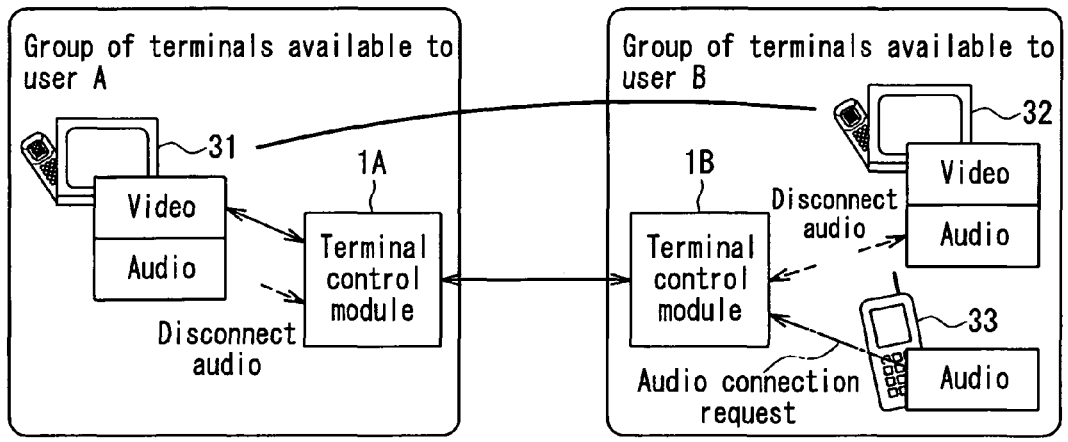
Figure 10C:
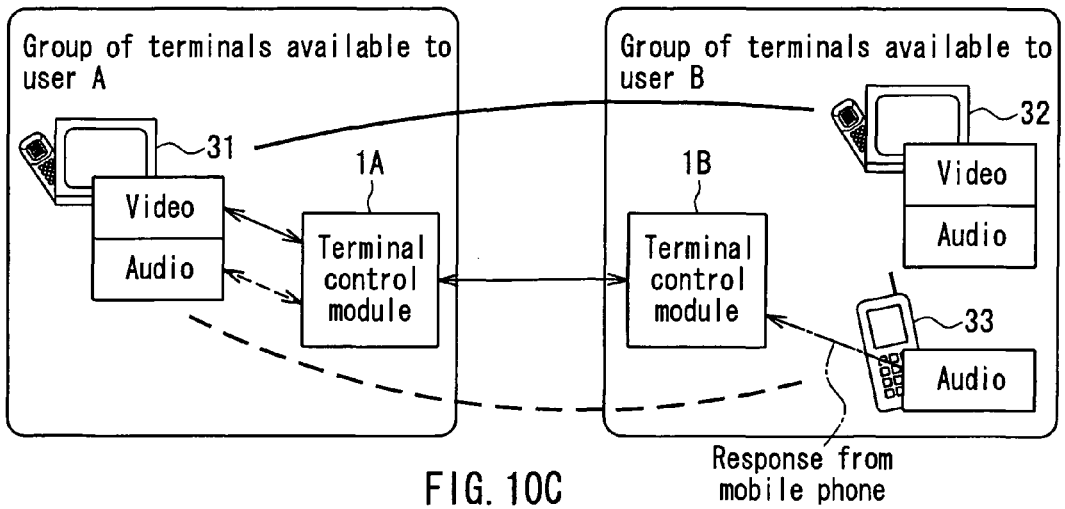

Hereinafter, referring to FIGS. 10A to 10C, the operation of the ubiquitous communication system according to the present embodiment will be described by way of more specific examples. FIGS. 10A to 10C illustrate an example in which communications are carried out between a user A and a user B, with numeral 1A indicating a terminal control module of the user A and numeral 1B indicating a terminal control module of the user B. Similarly, the reference numerals of the constituent members in the terminal control module of each user are also followed by A or B for differentiating the users.

Here, as shown in FIG. 10A, a videophone 31 is registered as a terminal available to the user A, and a videophone 32 is registered as a terminal available to the user B. Also, the user A and the user B are in conversation with each other using the videophone 31 and the videophone 32. A path P indicated by a thick line in FIG. 10A is a path along which actual audio and video packet are sent and received. In a usual IP telephony system, audio and video packet are exchanged directly between terminals as indicated by this path P. What passes through the terminal control module 1A or 1B is information about what kinds of media these packets are and where they will be sent (media information).

In the above state, the user B newly registers a mobile phone 33 as a user B's own available terminal. This registration operation can be achieved using a proximity sensing system such as RFID. For example, the following configuration may be adopted. An existing terminal (the videophone 32 in this case) is provided with an RFID reader, and a new terminal (the mobile phone 33 in this case) is provided with an RFID tag, in which information about the new terminal is stored. Then, when the new terminal is brought close to the existing terminal, the RFID reader of the existing terminal reads out the above-mentioned information in the tag, whereby it is determined that the terminal environment optimizing portion 13 of the existing terminal receives a registration request of the new terminal.

The terminal control module 1B that has received the registration request of the new terminal as described above refers to a current conversation media table and determines whether the "audio" is contained in the current conversation media table. The current conversation media table is a table for storing information about the medium through which users are currently in conversation, and provided in the virtual terminal portion 12 of the terminal control module 1 (not shown).

In the case illustrated by FIG. 10A, since the "audio" is originally present as the medium of the videophone 32, the terminal control module 1B refers to the priority of each terminal stored in the terminal control portion 11B and determines whether the priority of the existing terminal is higher than the priority of the new terminal. In this case, with regard to the "audio," the priority of the mobile phone 33 is set higher than that of the videophone 32, which is the existing terminal. Then, as shown in FIG. 10B, the terminal control module 1B disconnects the audio of the videophone 32 and newly sends a call request for an audio call (an audio connection request) to the mobile phone 33.

The terminal control module 1B that has received a response from the mobile phone 33 synthesizes the existing media information (video) and the media information contained in the response (audio) so as to generate a single change call request containing a single media information (audio and video) and send it to the other side.

The user A's terminal control module 1A that has received the change call request compares it with the current media information and, if there is any difference, sends the change call request to the terminal (the videophone 31 in this case). In this case, since terminal address information of the audio is different from original information, the terminal environment optimizing portion 13A of the terminal control module 1A sends the change request to the videophone terminal 31. The change request is made in a format describing all the media information after the change. The terminal that has received the change request compares the current media information and the media information contained in the change request, disconnects a session of the different medium and starts a new session with the media information contained in the request. How to judge whether these pieces of media information are the same depends on the way of implementation and thus can be determined freely. However, in the case where the address information of the medium is different, it is necessary to disconnect the existing connection and start an audio session with the new address.

Although the above description has illustrated the embodiments of the ubiquitous communication system according to the present invention, the present invention is not limited to the two embodiments described above but can be modified in various forms within the technical scope of the present invention.

The present invention can be utilized as a ubiquitous communication system, which provides a communication environment using various terminals of users and a communication control apparatus used on this system.

In accordance with the present invention, it is possible to provide a communication control apparatus that is interposed in a communication control channel between communication terminals, can manage a media condition and a communication state of the communication terminals in an integrated manner and optimize a communication terminal environment according to events of various types.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A communication control apparatus that, on a communication system in which a plurality of users communicate with each other, manages a group of available communication terminals including a plurality of communication terminal devices available to one user in an integrated manner and that is interposed in a communication with another user by using one of the plurality of communication terminal devices, the communication control apparatus comprising:
- a communication terminal control portion, provided so as to correspond to each of the communication terminal devices belonging to the group of available communication terminals, for retaining at least one communication terminal control portion media type identifier that is handled by each of the communication terminal devices and sending and receiving a call control information between the communication terminal devices;
- a virtual terminal portion that, by controlling a call with respect to the communication terminal device of the another user based on the call control information, functions as a single virtual terminal to make one call with respect to the another user by combining each call made simultaneously in the plurality of communication terminal devices belonging to the group of the available communication terminals; and
- a communication terminal environment optimizing portion that, at a time when an occurrence of an event regarding a communication control sequence or an event regarding a change in a communication terminal environment on the communication system is detected, compares a media type identifier of the event contained in an event information accompanying the event and the media type identifier in the communication terminal control portion so as to determine a communication medium, and selects a communication terminal device handling the determined communication medium from the group of available communication terminals, and incorporates the selected communication terminal device into the call in a current communication, wherein
- the group of available communication terminals is capable of carrying out the communication using multiple types of media,
- the communication system is a multimedia communication system in which the one user selects from the group of available communication terminals the communication terminal device corresponding to the media that the one user is utilizing, and
- the communication terminal control portion further retains a priority of each of media type identifiers at each of the communication terminal devices, wherein
- the event is a receipt of a call setup request from one of the plurality of communication terminal devices of the another user, and
- the communication terminal environment optimizing portion compares the media type identifier contained in the call setup request and the media type identifier in the communication terminal control portion, sends the call setup request to at least the communication terminal device whose media type identifier matches the media type identifier contained in the call setup request among the group of available communication terminals and, on receipt of a receiving response from the communication terminal device performing a receiving operation, sets a call by using the media type identifiers at the communication terminal device irrespective of the priority of each of the media type identifiers, and selects the communication terminal device having the media type identifier of a high priority from the communication terminal device handling a medium that is not contained in the receiving response as the communication terminal device to be incorporated into the call.

2. A communication control apparatus that, on a communication system in which a plurality of users communicate with each other, manages a group of available communication terminals including a plurality of communication terminal devices available to one user in an integrated manner and that is interposed in a communication with another user by using one of the plurality of communication terminal devices, the communication control apparatus comprising:
- a communication terminal control portion, provided so as to correspond to each of the communication terminal devices belonging to the group of available communication terminals, for retaining at least one communication terminal control portion media type identifier that is handled by each of the communication terminal devices and sending and receiving a call control information between the communication terminal devices;
- a virtual terminal portion that, by controlling a call with respect to the communication terminal device of the another user based on the call control information, functions as a single virtual terminal to make one call with respect to the another user by combining each call made simultaneously in a plurality of communication terminal devices belonging to the group of the available communication terminals; and
- a communication terminal environment optimizing portion that, at a time when an occurrence of an event regarding a communication control sequence or an event regarding a change in a communication terminal environment on the communication system is detected, compares a media type identifier of the event contained in an event information accompanying the event and the media type identifier in the communication terminal control portion so as to determine a communication medium, and selects a communication terminal device handling the determined communication medium from the group of available communication terminals, and incorporates the selected communication terminal device into the call in a current communication, wherein
- the group of available communication terminals is capable of carrying out the communication using multiple types of media,
- the communication system is a multimedia communication system in which the one user selects from the group of available communication terminals the communication terminal device corresponding to the media that the one user is utilizing, and
- the communication terminal control portion further retains a priority of each of media type identifiers of each of the communication terminal devices, wherein
- the event is a receipt of a call setup request from one of the plurality of communication terminal devices belonging to the group of communication terminals available to its own user, and
- upon detecting the call setup request from the communication terminal device, the communication terminal environment optimizing portion sets a call by using the media type identifiers at the communication terminal device irrespective of the priority of each of the media type identifiers, compares a media type identifier contained in the call setup request and the media type identifier in the communication terminal control portion and selects of the communication terminal device having the media type identifier of a high priority from the plurality of communication terminal devices corresponding to a media type identifier that is contained in the media type identifier in the communication terminal control portion but not contained in the call setup request as the communication terminal device to be incorporated into the call.

3. A communication control apparatus that, on a communication system in which a plurality of users communicate with each other, manages a group of available communication terminals including a plurality of communication terminal devices available to one user in an integrated manner and that is interposed in a communication with another user by using one of the plurality of communication terminal devices, the communication control apparatus comprising:

a communication terminal control portion, provided so as to correspond to each of the communication terminal devices belonging to the group of available communication terminals, for retaining at least one communication terminal control portion media type identifier that is handled by each of the communication terminal devices and sending and receiving a call control information between the communication terminal devices;

a virtual terminal portion that, by controlling a call with respect to the communication terminal device of the another user based on the call control information, functions as a single virtual terminal to make one call with respect to the another user by combining each call made simultaneously in the plurality of communication terminal devices belonging to the group of the available communication terminals; and a communication terminal environment optimizing portion that, at a time when an occurrence of an event regarding a communication control sequence or an event regarding a change in a communication terminal environment on the communication system is detected, compares a media type identifier of the event contained in an event information accompanying the event and the media type identifier in the communication terminal control portion so as to determine a communication medium, and selects a communication terminal device handling media type identifiers from the group of available communication terminals, and incorporates the selected communication terminal device into the call in a current communication, wherein the group of available communication terminals is capable of carrying out the communication using multiple types of media, the communication system is a multimedia communication system in which the one user selects from the group of available communication terminals the communication terminal device corresponding to the media that the one user is utilizing, and the communication terminal control portion further retains a priority of each of media type identifiers of each of the communication terminal devices, wherein the event is a receipt of a registration request from a new communication terminal device to be added to the group of communication terminals available to its own user, and the communication terminal environment optimizing portion retains the media type identifier of the another user during the communication with the another user, compares the media type identifier of the another user and a media type identifier contained in the registration request in a case where the event is detected during the communication, sets a call by using the media type identifiers at a new communication terminal device irrespective of the priority of each of the media type identifiers in a case where the media type identifier contained in the registration request is present in the media type identifier of the another user, and it is determined that the media type identifier contained in the registration request is not contained in the call during the communication, and sends a call setup request to the communication terminal device of the another user corresponding to a new medium, and in a case where the media type identifier contained in the registration request is present in the medium type identifier of the another user, and it is determined that the media type identifier contained in the registration request is contained in the call during the communication, when the priority of the media type identifier for the new communication terminal device is compared with the priority of the media type identifier for the communication terminal device with the call is established, and the priority of the media type identifier for the new communication terminal device is higher, the new communication terminal device is selected as the communication terminal device to be incorporated into the call, and a disconnection request of the medium of the terminal communication terminal with which the call is established is sent to reset the call regarding the medium using the new communication control device.

* * * * *